June 10, 1941. A. BERNHARD ET AL 2,245,522

PHOTOELECTRIC EXPOSURE METER

Filed Oct. 31, 1938

Inventors:
A. Bernhard &
G. Beyrich
By: Glascock Downing & Seebold
Attys

Patented June 10, 1941

2,245,522

UNITED STATES PATENT OFFICE 2,245,522

PHOTOELECTRIC EXPOSURE METER

Albrecht Bernhard and Guido Beyrich, Nuremberg, Germany, assignors to Metrawatt Aktiengesellschaft, Fabrik Elektrischer Messgeräte, Nuremberg, Germany, a German company Application October 31, 1938, Serial No. 238,041
In Germany October 11, 1937

6 Claims. (Cl. 88—23)

The invention relates to a photoelectric exposure meter which is equipped with two measurement ranges utilisable at choice. In contradistinction to known exposure meters of this type, in which the measurement range is changed, for example, by a built-in, turnable diaphragm, the exposure meter according to this invention is distinguished by a number of advantages. In particular the invention provides a particularly flat and handy construction of the instrument, a simpler method of manufacture and, finally, an angle of view better adapted to prevailing conditions when taking photographic exposures.

In the accompanying drawing—

Figure 1:
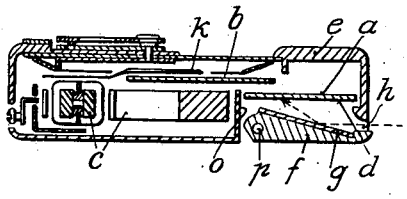
Figure 1 is a longitudinal section, Figure 2 a plan view and Figure 3 an end view of an exposure meter embodying the invention.

Referring to the drawing it will be seen that in the casing $e$ are accommodated the direct current meter $c$ and the photo-element $a$. The pointer $k$ of the direct current meter moves in front of the scale $b$ visible through a window. For the purpose of allowing for the sensitivity of the plate and the lens aperture (stop value) used for the exposure, the adjusting means customary in a known exposure meter as described for instance by U. S. Patent No. 2,129,114, dated September 6, 1938 are provided and are of no importance to the present invention. The photo-element $a$ may, as shown, be built-in by the side of the magnet and approximately in the same plane as the latter, but may be disposed in any other suitable position if this is required to suit the available accommodation. In front of the receiving surface $d$ of the photo-element $a$ is disposed the hinged cover $f$, which is adapted to be raised and is rotatably mounted in the casing $e$ by means of hinges or pivots $p$. The cover $f$ is furnished with a reflecting coating $g$ on its inner surface.

Figure 2:
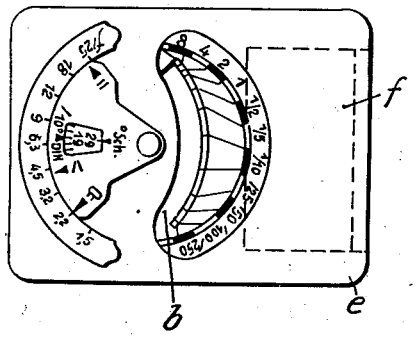
Figure 3:
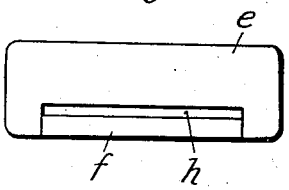

In the position shown in Figures 1 to 3, the cover $f$ leaves exposed a narrow slot $h$ on the face of the casing, through which the light to be measured passes on to the photo-element, as indicated in Figure 1. In the position illustrated in Figure 4, the cover $f$ exposes a substantially larger opening for the entry of light, so that in this case the light admitted to the photo-element is a multiple of the amount admitted when the cover is pushed in, for example ten or twenty times that amount. Two different measurement ranges bearing a desired relationship to one another correspond accordingly with the two illustrated positions of the cover. The inclination of the reflecting coating with respect to the horizontal receiving surface of the photo-element amounts, in the case of the position of the cover shown in Figure 4, to preferably about 45° or rather less. In the position shown in Figure 1, the inclination may be very slight and amount to only a few degrees. An arrangement is also possible in which the reflecting coating lies parallel to the plane of the photo-element when the cover is pushed in, while the light rays entering at the front are diffusely reflected in the rear wall of the light passage and thus pass on to the photo-element.

Figure 4:
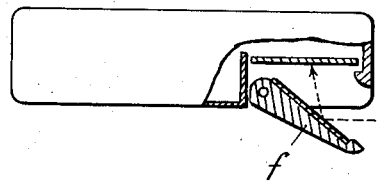
Figure 4 is a side elevation, partly in section, to show an alternative position of the cover.

As shown, in the preferred arrangement the detrimental outside light, particularly light from above, is kept away from the photo-element. The angle of view is more limited in the position shown in Figure 1 than when the cover is opened, as shown in Figure 4. This mode of operation is advantageous for the reason that the exposure meter is intended to be used with the cover opened only in conditions of low intensity of light with few contrasts, while it is intended to be used with the cover closed for measurements with high intensity of light and objects rich in contrasts.

Figure 5:
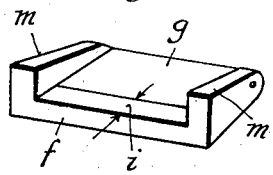
Figure 5 is a perspective view of a cover plate.

The reflecting coating $g$ is preferably disposed on the cover $f$ in such a way that a narrow border is left on the face, which is designated in Figure 5 by $i$. If necessary, the cover $f$ can be given raised side surfaces $m$ (Figure 5) which keep off the detrimental side light.

Figure 6A:
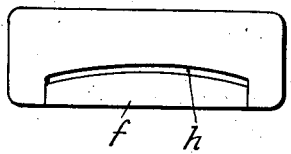
Figures 6a and 6b show alternative forms of same.
Figure 6B:
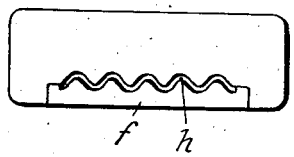

Since, on the one hand, in order to keep off the light from above, it is necessary to keep the light slot $h$, formed when the cover is closed, narrow and, on the other hand, the length of the light slot is restricted by the width of the casing, the light slot may advantageously be given a bent or curved shape in accordance with the invention, such as that illustrated by way of example in Figures 6a and 6b. In the embodiment illustrated in Figure 6a, the length of the light slot $h$ is increased by its curved form. In the embodiment shown in Figure 6b, the light slot is undulate, a sinusoidal undulate form of the light slot having been found particularly suitable.

The hinged cover is at the same time a protection for the photo-element, particularly as it closed of its own accord when the instrument is put away, and protects the element not only against mechanical injury but also against detrimental exposure to sunlight.

Under certain circumstances it is advantageous to insert a diffusely reflecting material in the light passage of the instrument. The rear wall *o* of the light passage (Figure 1) may, in particular, be coated with white paint or other reflecting material, in order to obtain adequate reflecting on to the photo-element of light rays entering exactly from the front.

It is naturally possible to use the lid not only in the positions shown in Figures 1 and 4, but also in suitable intermediate positions.

The idea of giving the light slot a curved form, varying from that of a straight line, such as is illustrated for example in Figures 6a and 6b, may also be utilised independently of the use of a hinged cover with reflecting coating. On the contrary, this idea may be applied to any exposure meter in which the light falls through an inlet slot on to the photo-element.

We claim:

1. Photoelectric exposure meter having two measurement ranges, and comprising an electric current meter, a photoelectric element electrically connected to the current meter, the element and the current meter housed in a casing the element being arranged parallel to the plane of the upper face of the casing with its sensitive surface directed downwardly, the casing provided in front of the photoelectric element with a hinged cover having a reflecting coating, the cover being adapted to be brought into an opened position and into a closed position, said two positions corresponding to the measuring ranges and forming at the front side of the casing two definite inlet apertures of different size for the light admitted to the coating of the cover and hence reflected to the element, the cover being in the opened position inclined at about 45° with respect to the plane of the element, in the closed position inclined slightly forward so as to form a slot for the entry of light, said slot being on all sides defined by the walls of said casing and by said cover.

2. Exposure meter as claimed in claim 1, characterised in that the magnet of the current meter is arranged parallel to the plane of the upper face of the casing, the photoelectric element being disposed by the side of the magnet, parallel to and at the same level as the same.

3. Photoelectric exposure meter having two measurement ranges, and comprising an electric current meter, a photoelectric element electrically connected to the current meter, the element and the current meter housed in a casing the element being arranged parallel to the plane of the upper face of the casing with its sensitive surface directed downwardly, the casing provided in front of the photoelectric element with a hinged cover having a reflecting coating, the cover being adapted to be brought into an opened position and into a closed position, said two positions corresponding to the measuring ranges and forming at the front side of the casing two definite inlet apertures of different size for the light admitted to the coating of the cover and hence reflected to the element, the cover being in the opened position inclined at about 45° with respect to the plane of the element, in the closed position inclined slightly forward so as to form a slot for the entry of light, the cover being provided at the edges with upstanding borders said slot being on all sides defined by the walls of said casing and by said cover.

4. Photoelectric exposure meter having two measurement ranges, and comprising an electric current meter, a photoelectric element electrically connected to the current meter, the element and the current meter housed in a casing, the casing provided in front of the photoelectric element with a hinged cover having a reflecting coating, the hinges being provided at the inner end of the cover in such a manner that the cover can be brought into two positions corresponding to the measuring ranges and forming at the front side of the casing two definite inlet apertures of different size for the light admitted to the coating of the cover and hence reflected to the element, the cover being in one position inclined at about 45° with respect to the plane of the element, in the other position inclined slightly forward so as to form a slot for the entry of light, the slot being shaped as a narrow rectangle, the long side of which is parallel to the upper side of the casing.

5. Photoelectric exposure meter having two measurement ranges, and comprising an electric current meter, a photoelectric element electrically connected to the current meter, the element and the current meter housed in a casing, the casing provided in front of the photoelectric element with a hinged cover having a reflecting coating, the hinges being provided at the inner end of the cover in such a manner that the cover can be brought into two positions corresponding to the measuring ranges and forming at the front side of the casing two definite inlet apertures of different size for the light admitted to the coating of the cover and hence reflected to the element, the cover being in one position inclined at about 45° with respect to the plane of the element, in the other position inclined slightly forward so as to form a slot for the entry of light, the slot having an undulated form, the middle axis of the undulating curve being parallel to the upper side of the casing.

6. Photoelectric exposure meter having two measurement ranges, and comprising an electric current meter, a photoelectric element electrically connected to the current meter, the element and the current meter housed in a casing, the casing provided in front of the photoelectric element with a hinged cover having a reflecting coating, the hinges being provided at the inner end of the cover in such a manner that the cover can be brought into two positions corresponding to the measuring ranges and forming at the front side of the casing two definite inlet apertures of different size for the light admitted to the coating of the cover and hence reflected to the element, the cover being in one position inclined at about 45° with respect to the plane of the element, in the other position inclined slightly forward so as to form a slot for the entry of light, the slot having a sinusoidal undulated form, the middle axis of the undulating curve being parallel to the upper side of the casing.

ALBRECHT BERNHARD.
GUIDO BEYRICH.